United States Patent
Nelson et al.

(10) Patent No.: US 9,588,882 B2
(45) Date of Patent: Mar. 7, 2017

(54) NON-VOLATILE MEMORY SECTOR ROTATION

(71) Applicant: Intel Corporation, Santa Clara, CA (US)

(72) Inventors: Scott E. Nelson, Vancouver (CA); Zion S. Kwok, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/094,743

(22) Filed: Dec. 2, 2013

(65) Prior Publication Data

US 2015/0154107 A1    Jun. 4, 2015

(51) Int. Cl.
| G06F 12/00 | (2006.01) |
| G06F 12/02 | (2006.01) |
| G06F 3/06 | (2006.01) |
| G06F 12/04 | (2006.01) |

(52) U.S. Cl.
CPC ............ G06F 12/0238 (2013.01); G06F 3/06 (2013.01); *G06F 12/04* (2013.01); *Y02B 60/1225* (2013.01)

(58) Field of Classification Search
CPC .. G06F 12/0246; G06F 3/0679; G06F 3/0688; G06F 12/0238
USPC .................................................. 711/102–103
See application file for complete search history.

(56) References Cited

U.S. PATENT DOCUMENTS

| 7,212,440 | B2 * | 5/2007 | Gorobets ................. 365/185.11 |
| 2010/0223530 | A1 | 9/2010 | Son et al. |
| 2010/0269017 | A1 | 10/2010 | Bueb |
| 2011/0209028 | A1 | 8/2011 | Post et al. |
| 2011/0239088 | A1 | 9/2011 | Post |
| 2014/0016698 | A1 * | 1/2014 | Joshi et al. ............. 375/240.12 |

FOREIGN PATENT DOCUMENTS

WO    2013/089715 A1    6/2013

OTHER PUBLICATIONS

International Search report and Written Opinion received for PCT Application No. PCT/US2011/065006, mailed on Aug. 24, 2012, 9 pages.

* cited by examiner

*Primary Examiner* — Jasmine Song
(74) *Attorney, Agent, or Firm* — Alpine Technology Law Group LLC

(57) ABSTRACT

Methods and apparatus related to non-volatile memory page sector rotation are described. In one embodiment, logic rotates the order of one or more sectors by a rotation value prior to storage of the one or more sectors in a non-volatile memory device. Logic then rotates the one or more sectors back by the rotation value after reading the one or more sectors from the non-volatile memory device. Furthermore, at least one indirection block (corresponding to the one or more sectors) is stored in at least two different logical memory pages of the non-volatile memory. Other embodiments are also disclosed and claimed.

25 Claims, 8 Drawing Sheets

NON-VOLATILE MEMORY SECTOR ROTATION

FIELD

The present disclosure generally relates to the field of electronics. More particularly, some embodiments generally relate to non-volatile memory page sector rotation.

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during the run-time of the program. On the other hand, persistent data structures stored in non-volatile memory are available beyond the run-time of a program and can be reused. Moreover, new data is typically generated as volatile data first, before the user or programmer decides to make the data persistent. For example, programmers or users may cause mapping (i.e., instantiating) of volatile structures in volatile main memory that is directly accessible by a processor. Persistent data structures, on the other hand, are instantiated on non-volatile storage devices like rotating disks attached to Input/Output (I/O or IO) buses or non-volatile memory based devices like flash memory.

As computing capabilities are enhanced in processors, one concern is the speed at which memory may be accessed by a processor. For example, to process data, a processor may need to first fetch data from a memory. After completion of the data processing, the results may need to be stored in the memory. Therefore, the memory access speed can have a direct effect on overall system performance.

Another important consideration is power consumption. For example, in mobile computing devices that rely on battery power, it is very important to reduce power consumption to allow for the device to operate while mobile. Power consumption is also important for non-mobile computing devices as excess power consumption may increase costs (e.g., due to additional power usage, increased cooling requirements, etc.), shorten component life, limit locations at which a device may be used, etc.

Hard disk drives provide a relatively low-cost storage solution and are used in many computing devices to provide non-volatile storage. Disk drives however use a lot of power when compared to solid state drives (including non-volatile memory such as flash memory) since a disk drive needs to spin its disks at a relatively high speed and move disk heads relative to the spinning disks to read/write data. This physical movement generates heat and increases power consumption. Also, flash drives are much faster to read and write than hard drives. To this end, many computing segments are migrating towards flash memory devices that are non-volatile.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2A and 2B illustrate sample pages without sector rotation and with sector rotation, respectively.

DETAILED DESCRIPTION

Figure 1:
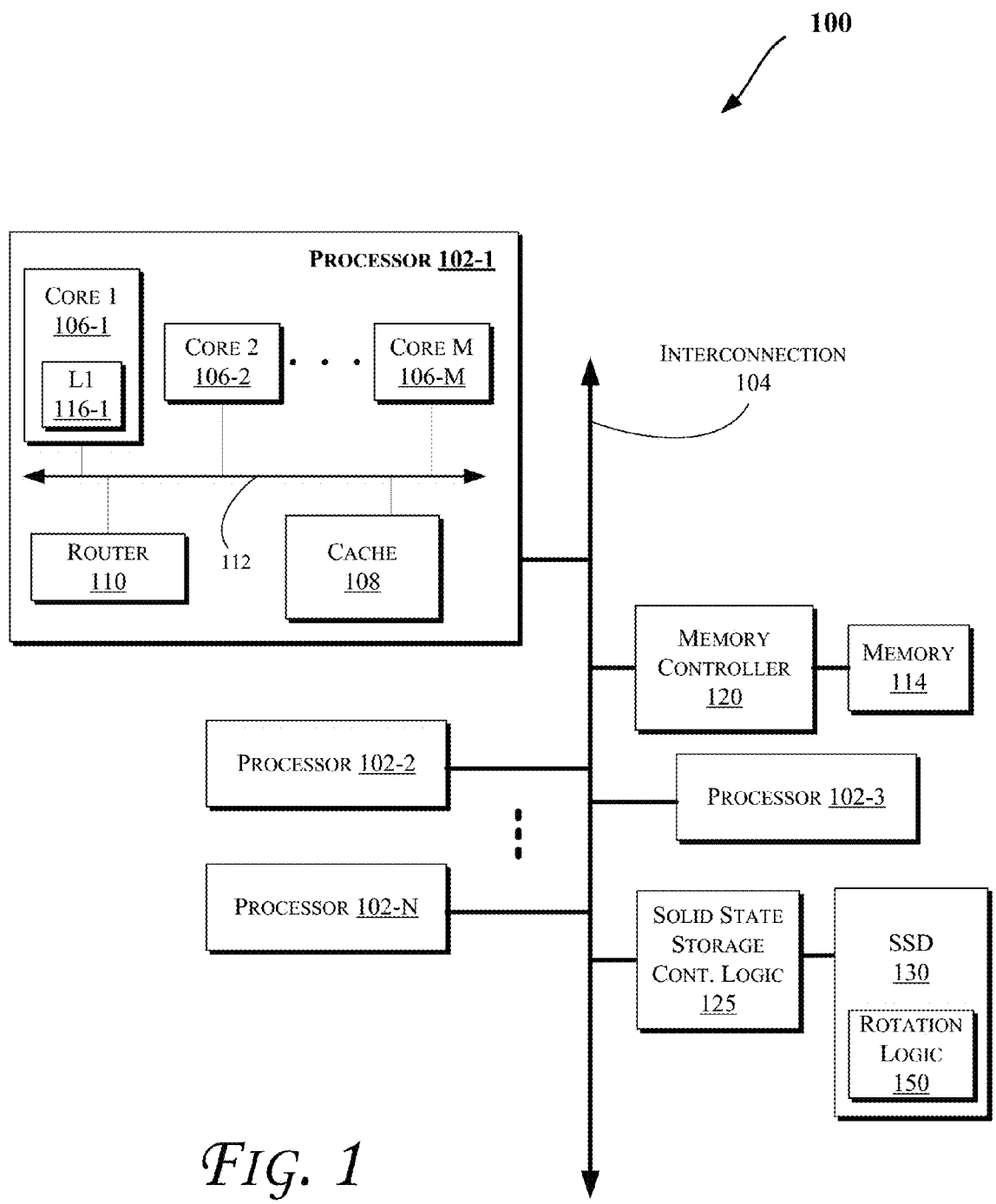
FIGS. 1 and 5-7 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

For Solid State Drives (SSDs), 15 sectors are sometimes packed into a nominally 8 kB page (where "B" refers to a "Byte" or 8 bits and "k" refers to "kilo"), and 30 sectors into a nominally 16 kB page. This packing ratio is used to make room for the extra user data required for the 528 B sector size and to allocate more ECC (Error Correction Code) parity bytes. When 4 kB ECC codewords are used, only 3.75 codewords will fit into a 16 kB page (the final codeword has to be shortened and will contain only 6 sectors instead of the usual 8). See, e.g., FIG. 2A. In an embodiment, SSDs discussed herein use a flat indirection system with 4 kB granularity (although other indirection systems may be used too). An indirection system generally refers to a logical to physical address map. Also, because most file systems use a 4 kB cluster size (and do all their transactions in 4 kB blocks), SSDs discussed herein align their indirection system with the file system clusters in some embodiments. Hence, SSD and hard disk drive designs may be optimized around providing better performance for aligned 4 kB transactions, even though the smallest addressable physical unit may be a single sector (e.g., of 512 B).

Figure 2A:
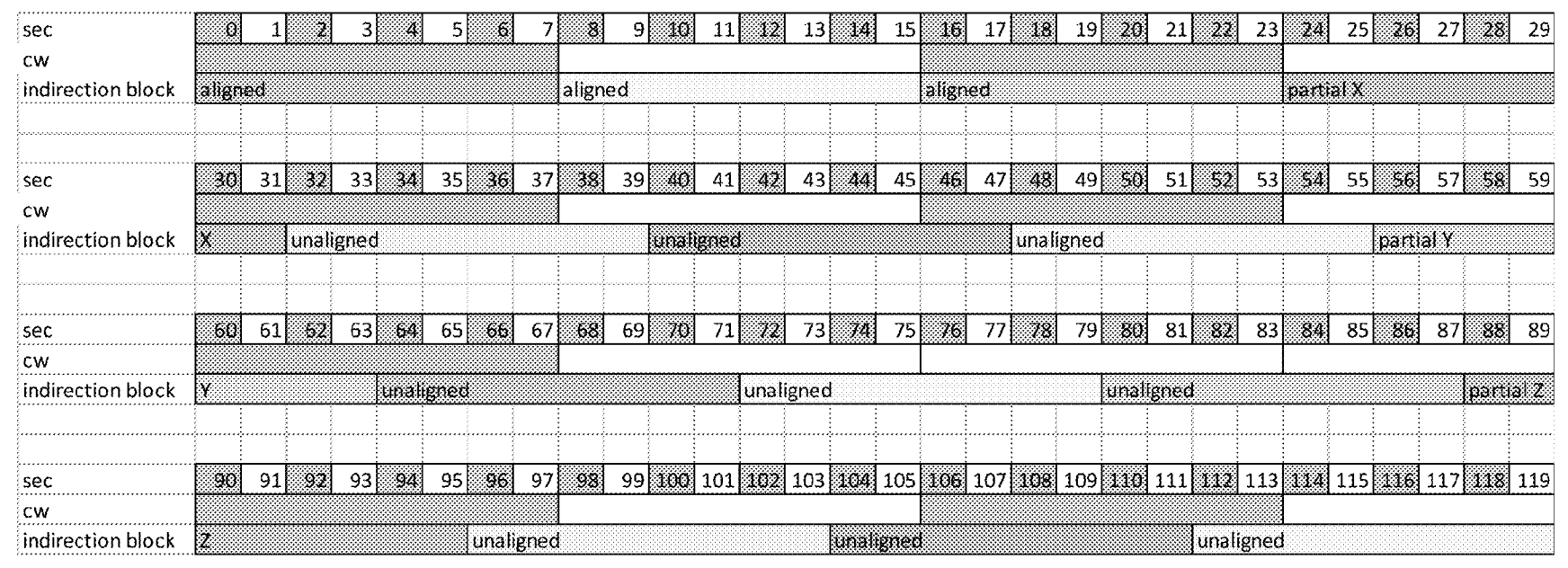

Moreover, when this layout is followed, the result may be that the 4 kB indirection block units are mostly not aligned with the 4 kB codewords (see, e.g., FIG. 2A). But, 4 kB codewords need to be read in their entirety, or else error correction will not work. As such, retrieving a 4 kB aligned block of data may require reading more than 4 kB from the flash memory when the codeword is unaligned (e.g., the start of the 4 kB codeword is not aligned to 4 kB boundaries in the logical address space), resulting in substantial inefficiency (e.g., additional number) of read I/O (Input/Output) operations (also referred to as "read amplification"). For instance, for a 30 sector per page layout, the average read amplification for a 4 kB random read workload is 1.73, which is very high. The higher value of read amplification is undesirable because it slows down the read operations and increases power consumption (e.g., by requiring additional input/output (I/O) bandwidth to read blocks of 4 kB data that are split between two 4 kB codewords and often even split between different NAND flash pages).

To this end, some embodiments provide techniques for page sector rotation in Non-Volatile Memory (NVM), e.g., to more closely align ECC codewords with page sizes. For example, ECC codewords stored on a NAND flash Solid State Drive (SSD) may be aligned along the indirection data units/blocks of a logical page size. Such implementations reduce the number of read operations that need to be performed to retrieve codewords, when compared with retrieval of codewords that are not mostly aligned (e.g., at least in part because the unaligned codeword retrieval may require additional bandwidth and/or power consumption). Furthermore, any reduction in the number of read I/O operations can significantly improve performance and/or reduce power consumption.

Further, while some embodiments are discussed with reference to NAND flash memory technology, techniques discussed herein may be applied to any type of NVM such as NOR flash, or other non-volatile memory technologies such as resistive random access memory, Phase Change Memory (PCM), Spin Torque Transfer Random Access Memory (STTRAM), 3D (3-Dimensional) Cross Point Memory, etc.

The techniques discussed herein may be provided in various computing systems (e.g., including a non-mobile computing device such as a desktop, workstation, server, rack system, etc. and/or a mobile computing device such as a smartphone, tablet, UMPC (Ultra-Mobile Personal Computer), laptop computer, Ultrabook™ computing device, smart watch, smart glasses, etc.), including those discussed with reference to FIGS. 1-7. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a Level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments. Also, in some embodiments, system 100 may include logic (e.g., solid state storage controller logic 125) to control access to one or more Non-Volatile Memory devices (including one or more SSDs 130), where the one or more NVM devices may be provided on the same integrated circuit die in some embodiments. In an embodiment, controller 120 and 125 may be combined to form a single memory controller.

Furthermore, even though logic 125 is shown to be directly coupled to the interconnection 104 in FIG. 1, logic 125 can alternatively communicate via a storage bus/interconnect (such as the SATA (Serial Advanced Technology Attachment) bus, SAS (Serial Attached SCSI (Small Computer System Interface)) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 5-6), etc.). Additionally, logic 125 may be incorporated into a memory controller logic (such as those discussed with reference to FIGS. 1 and 5-7) or provided on a same integrated circuit device in various embodiments.

Additionally, SSD 130 may be coupled to (or alternatively include, e.g., as shown in FIG. 1) rotation logic 150 to perform sector rotation/de-rotation operations on sectors (or indirection blocks) read/stored in NAND flash media of SSD 130, as will be further discussed herein, e.g., with reference to FIGS. 2A-4. System 100 may also include one or more sensors (not shown) coupled to logic 125 to provide information (e.g., in the form of one or more bits or signals) to indicate the status of or values detected by the one or more sensors. The sensor(s) may be provided proximate to components of system 100 (or other computing systems discussed herein such as those discussed with reference to other figures including 5-7, for example), including the cores 106, interconnections 104 or 112, components outside of the processor 102, SSD, SSD bus, SATA bus, SAS bus, logic 125, etc., to sense variations in various factors affecting power/thermal behavior of the system/platform, such as temperature, operating frequency, operating voltage, power consumption, and/or inter-core communication activity, etc.

Figure 2B:
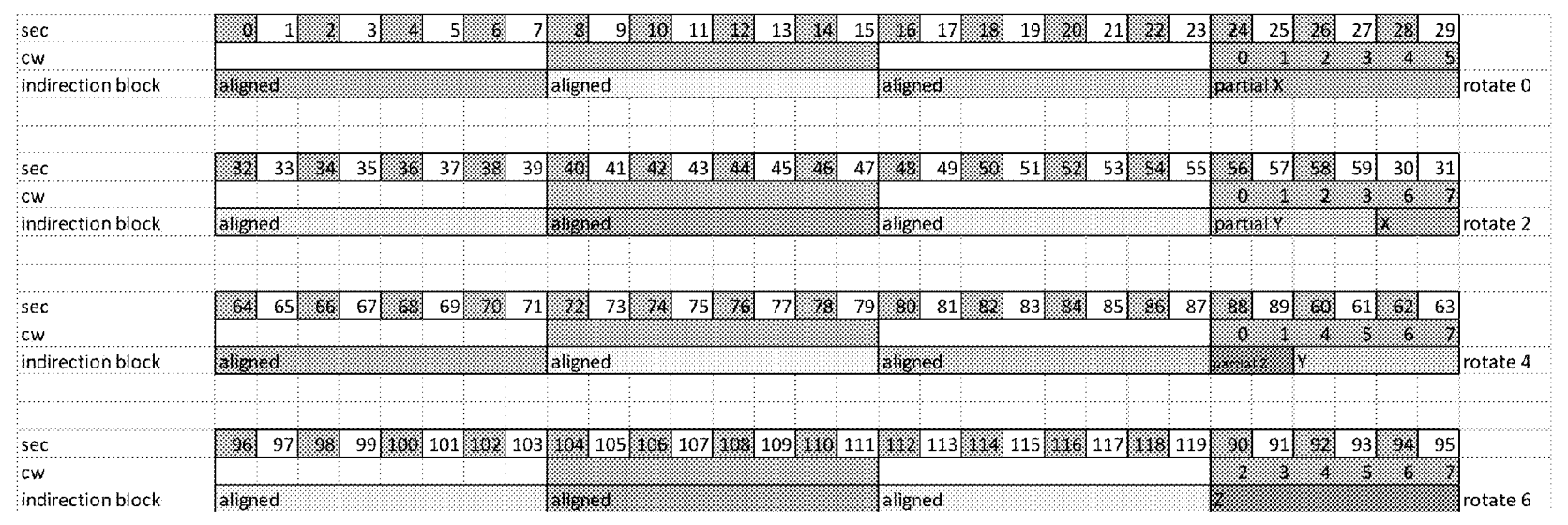

FIGS. 2A and 2B illustrate sample pages without sector rotation and with sector rotation, respectively. In FIGS. 2A and 2B, "sec" refers to "sector" and "cw" refers to "codeword." Each row illustrates a sample page, nominally 16 kB, (having 30 sectors) with corresponding sector numbers (on the top and sequentially numbered from 0 to 119), sample codewords, and indirection data units (on the bottom of each row, indicating aligned or partial/unaligned states for the corresponding codewords shown in the cw row). As shown, each 4 kB codeword needs 8 sectors to be aligned. The final codeword in each page in FIG. 2A is shortened to 6 sectors.

This forces the final 2 sectors to be pushed to the next page, which causes the subsequent codewords to be unaligned in the next pages. The pattern repeats every 4 pages in an embodiment.

Referring to FIG. 2B, if the 4 kB indirection data units can be aligned with the 4 kB codewords, then most of the read amplification is eliminated. This is achieved by rotating the location of the sectors within a page as shown in FIG. 2B, according to an embodiment. Moreover, some embodiments reduce the read amplification for 4 kB random read operations on a 30 sector page layout with 4 kB codewords from 1.73 to 1.1 (i.e., a reduction of about 36%). In some implementations, this allows for 4 kB random read operations to increase from 1.0 per second (normalized) to 1.57 per second (i.e., an increase of about 57%). Similar reductions may be achieved on other page layouts, where the number of sectors per page is not a multiple of the number of sectors per codeword.

More particularly, the indirection units that are split between pages are marked in FIGS. 2A and 2B with X, Y, and Z to indicate the location of the sectors for each split indirection unit. Referring to FIG. 2B, the first rotation (e.g., in the first row of FIG. 2B) is by zero sectors (i.e., no rotation), so sectors 6, 7 of the final codeword of the first row will be pushed to the next page which appears on the second row. The second rotation (e.g., in the second row of FIG. 2B) is by 2 sectors, which result in sectors 6,7 of the final codeword of the first row (i.e., sectors 30 and 31 which were at the beginning of the second row in FIG. 2A) to shift to the end of the second page/row. The third rotation (e.g., in the third row of FIG. 2B) is by 4 sectors, which results in sectors 60,61,62,63 of the final codeword of the second row (which were at the beginning the third row in FIG. 2A) to shift to the end of the third row. And, the fourth rotation (e.g., in the fourth row of FIG. 2B) is by 6 sectors, which results in sectors 90,91,92,93,94,95 of the final codeword of the third row (which were at the beginning the fourth row in FIG. 2A) to shift to the end of the third row.

Figure 3:
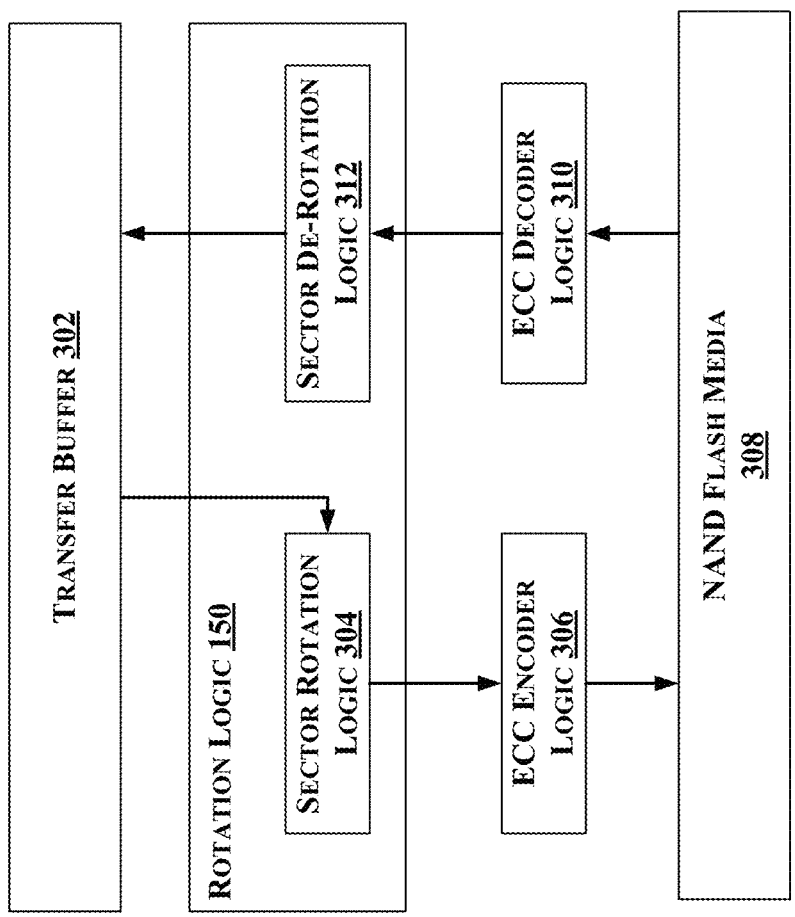
FIG. 3 illustrates a block diagram of some components of a sector rotation system, according to an embodiment.

FIG. 3 illustrates a block diagram of some components of a sector rotation system, according to an embodiment. A transfer buffer 302 stores 4 kB aligned data. Sector rotation may be one of several data transformation operations that are performed between an SSD controller's transfer buffer 302 (e.g., including Static Random Access Memory (SRAM)) and NAND flash media 308. For write operations (i.e., originating from the transfer buffer 302), sector rotation (e.g., via sector rotation logic 304) is the first operation applied. For read operations, sector de-rotation (e.g., via sector de-rotation logic 312) is the last operation applied prior to storage in the transfer buffer 302.

Further, since the rotation layer (via the rotation logic 150) is immediately below the transfer buffer 302, the sector rotation can be applied by changing the order that sectors are read from the transfer buffer 302, and hence no additional storage is required. The rotation value can be calculated based on the information in the address indirection table, that maps logical addresses to physical addresses in NAND flash. For example, the rotation value may be sector_offset [2:0] or by an additional 2 sectors for each subsequent rotation (starting at 0 rotation such as discussed with reference to FIG. 2B), which are stored in an address indirection table (not shown) in the SSD 130 (e.g., in RAM 488 and/or firmware 490 of FIG. 4) in an embodiment. Hence, the rotation value for the sectors is a multiple of two in an embodiment.

For a read operation, the rotation is reversed (by the de-rotation logic 312) just before the data is written back to the transfer buffer 302. Each sector is written back to the correct location in the transfer buffer 302, so that the original ordering is restored. The NAND flash read channel logic (e.g., memory controller 486 of FIG. 4) may also be aware of the rotation, so it can read the correct portion of a page in the case that only part of the page is being read.

In an embodiment, the layout of codewords on the page is the same regardless of which rotation value is used. This ensures that a page can always be read and decoded even if the rotation value is unknown. If a page is read with the wrong rotation value, the sectors will be put into the transfer buffer 302 in the wrong place. This will result in a Logical Block Address (LBA) mismatch, which will be detected by the SSD controller logic (since the plain text LBA may be stored for each sector). If the rotation value is unknown, it can be determined by reading the data with a rotation value of 0 and then inspecting the plaintext LBAs as they are stored into the transfer buffer. The least significant three bits in the LBA fields of the final codeword will reveal the rotation value (e.g., as shown in FIG. 2B, 0, 1, 2, 3, 4, 5 for rotation=0; 0, 1, 2, 3, 6, 7 for rotation=2, 0, 1, 4, 5, 6, 7 for rotation=4, and 2, 3, 4, 5, 6, 7 for rotation=6).

As shown in FIG. 3, after sector rotation by logic 304, an ECC encoder logic 306 encodes the codewords prior to storage in the NAND flash media 308. Also, the encoded codewords stored in the NAND flash media 308 are first decoded by the ECC decoder logic 310 prior to sector de-rotation by the sector de-rotation logic 312. Accordingly, read amplification is a new problem associated with the use of 4 kB codewords. With the sector rotation techniques discussed herein, the read amplification problem may be addressed in order to realize the benefits of 4 kB codewords such as improved ECC decoding performance, to support newer NAND flash devices with higher densities, and higher error rates.

Figure 4:
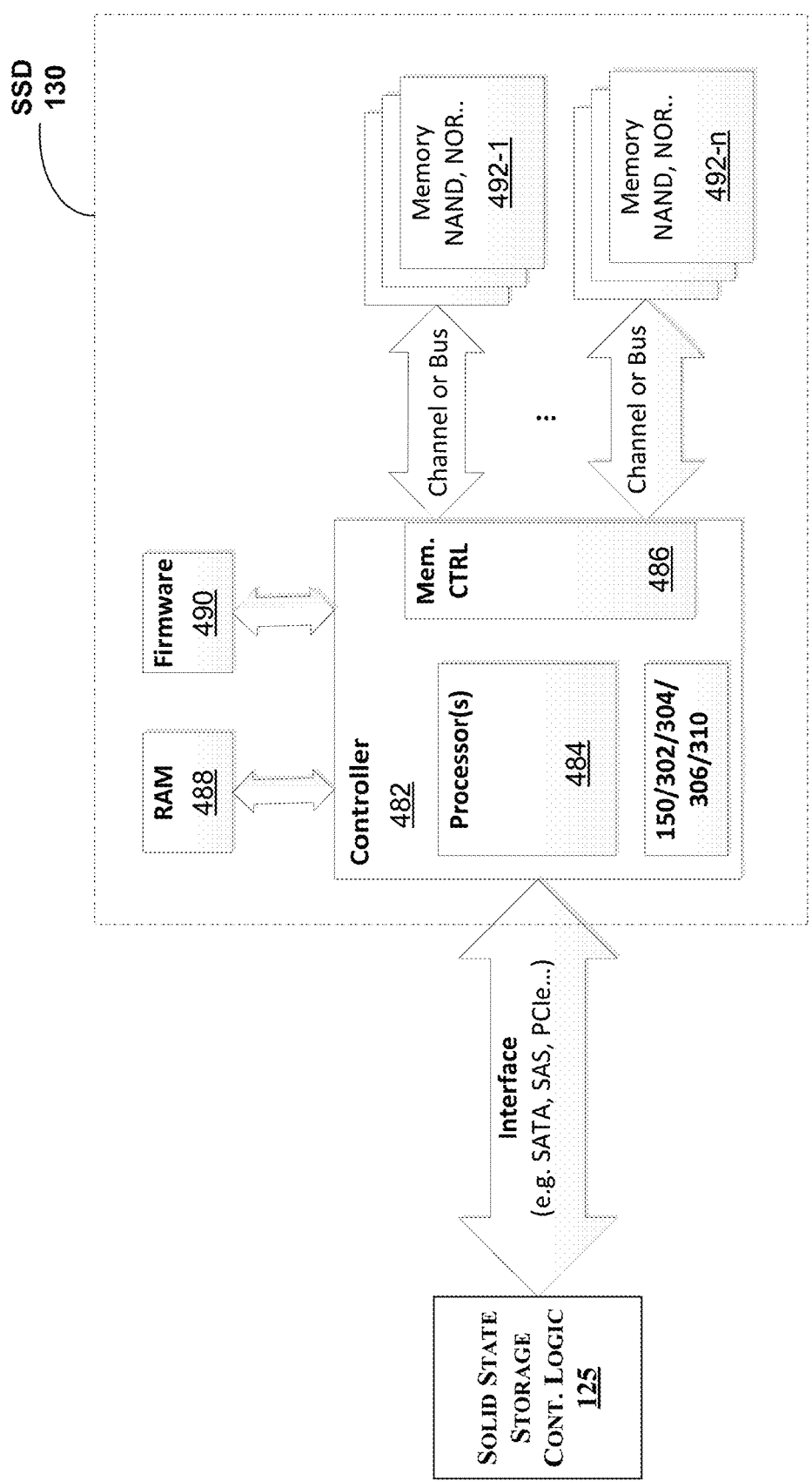
FIG. 4 illustrates a block diagram of various components of an SSD, according to an embodiment.

FIG. 4 illustrates a block diagram of various components of an SSD, according to an embodiment. As shown in FIG. 4, SSD 130 includes a controller logic 482 (which in turn includes one or more processor cores or processors 484 and a memory controller logic 486), Random Access Memory (RAM) 488, firmware storage 490, and one or more memory modules or dies 492-1 to 492-n (which may include NAND flash, NOR flash, or other types of non-volatile memory). Memory modules 492-1 to 492-n are coupled to the memory controller logic 486 via one or more memory channels or busses. Also, SSD 130 communicates with logic 125 via an interface (such as a SATA, SAS, PCIe (Peripheral Component Interconnect express), etc. interface). One or more of the operations discussed with reference to FIGS. 2A-3 may be performed by one or more of the components of FIG. 4 (e.g., processors 484 and/or controller 482 may cause performance of the read operations from memory modules 492-1 to 492-n to rotation/de-rotation of codewords). Also, one or more of the operations of FIGS. 2A-3 may be programmed into the firmware 490. In an embodiment, memory 492-1 to 492-n may be the same or similar to the NAND flash media 308. Further, controller 482 may include one or more of the transfer buffer 302, logics 150/304/306/310.

Figure 5:
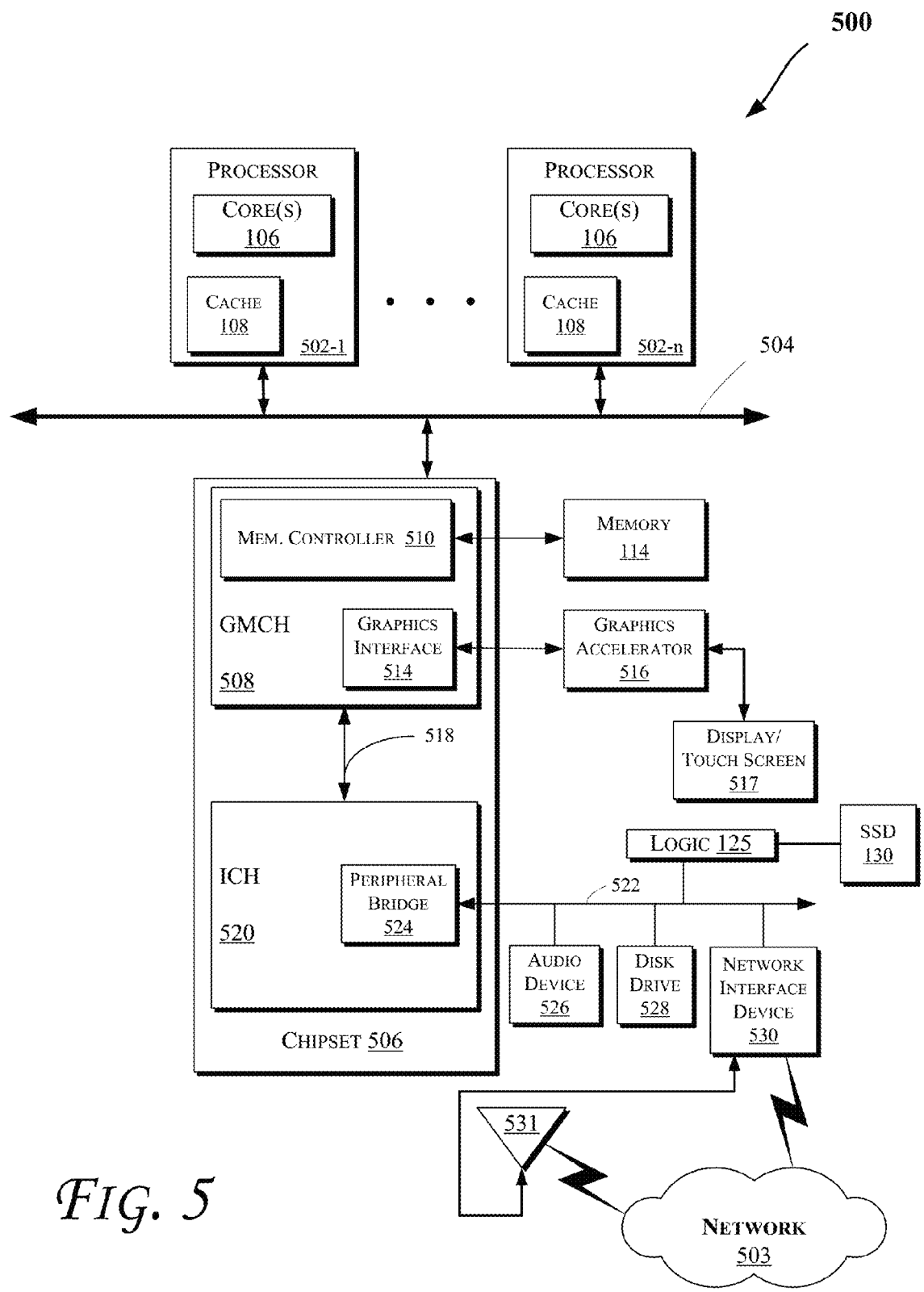

FIG. 5 illustrates a block diagram of a computing system 500 in accordance with an embodiment. The computing system 500 may include one or more central processing unit(s) (CPUs) 502 or processors that communicate via an interconnection network (or bus) 504. The processors 502 may include a general purpose processor, a network processor (that processes data communicated over a computer network 503), an application processor (such as those used in cell phones, smart phones, etc.), or other types of a processor (including a reduced instruction set computer (RISC) processor or a complex instruction set computer (CISC)). Various types of computer networks 503 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 5G, Low Power Embedded (LPE), etc.). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment) that communicates with the memory 114. The memory 114 may store data, including sequences of instructions that are executed by the CPU 502, or any other device included in the computing system 500. Also, system 500 includes logic 125 and SSD 130 (which may be coupled to system 500 via bus 522 such as illustrated, via other interconnects such as 504, where logic 125 is incorporated into chipset 506, etc. in various embodiments). In one embodiment, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk, flash, PCM, 3D Cross Point Memory, Resistive Random Access Memory, and STTRAM. Additional devices may communicate via the interconnection network 504, such as multiple CPUs and/or multiple system memories.

The GMCH 508 may also include a graphics interface 514 that communicates with a graphics accelerator 516. In one embodiment, the graphics interface 514 may communicate with the graphics accelerator 516 via an accelerated graphics port (AGP) or Peripheral Component Interconnect (PCI) (or PCI express (PCIe) interface). In an embodiment, a display 517 (such as a flat panel display, touch screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 517.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interface). As shown, the network interface device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 5G, LPE, etc.) communicate with the network 503. Other devices may communicate via the bus 522. Also, various components (such as the network interface device 530) may communicate with the GMCH 508 in some embodiments. In addition, the processor 502 and the GMCH 508 may be combined to form a single chip. Furthermore, the graphics accelerator 516 may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
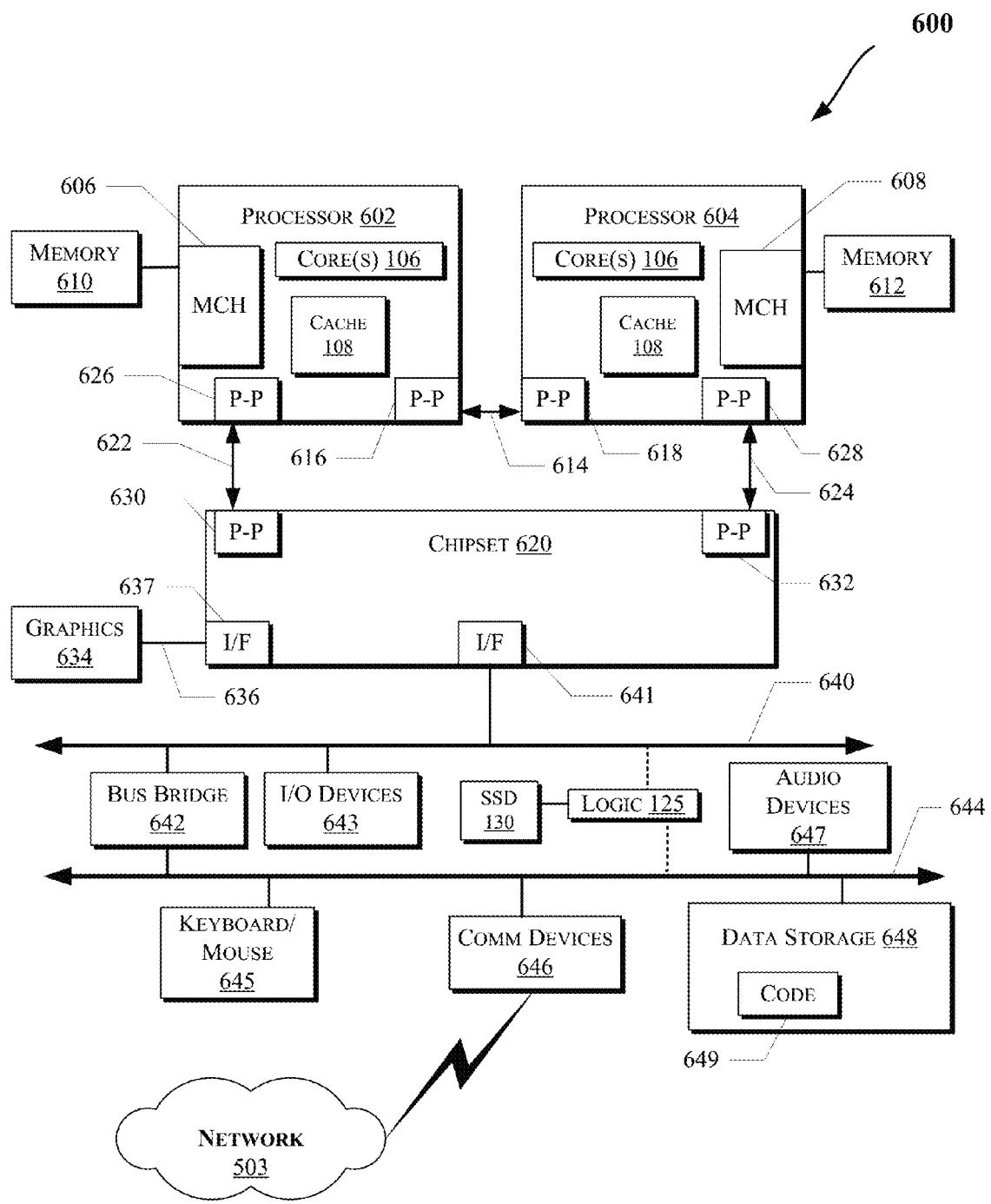

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 in some embodiments. Furthermore, system 600 includes logic 125 and SSD 130 (which may be coupled to system 600 via bus 640/644 such as illustrated, via other point-to-point connections to the processor(s) 602/604 or chipset 620, where logic 125 is incorporated into chipset 620, etc. in various embodiments).

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG. 5, the graphics interface 636 may be coupled to a display device (e.g., display 517) in some embodiments.

As shown in FIG. 6, one or more of the cores 106 and/or cache 108 of FIG. 1 may be located within the processors 602 and 604. Other embodiments, however, may exist in other circuits, logic units, or devices within the system 600 of FIG. 6. Furthermore, other embodiments may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503, as discussed with reference to network interface device 530 for example, including via antenna 531), audio I/O device, and/or a data storage device 648. The data storage device 648 may store code 649 that may be executed by the processors 602 and/or 604.

Figure 7:
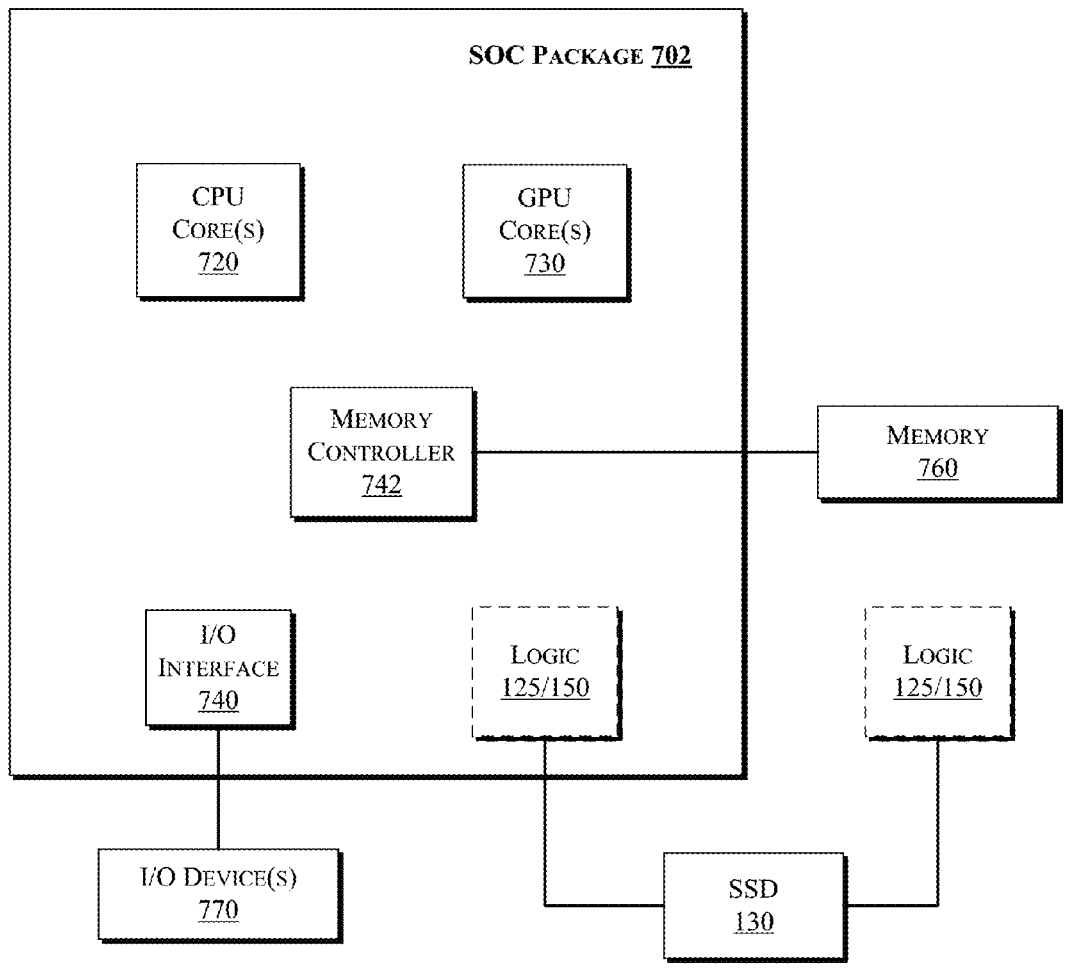

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged onto a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 125/150 in an embodiment. Alternatively, the logic 125/150 may be provided outside of the SOC package 702 (i.e., as a discrete logic).

The following examples pertain to further embodiments. Example 1 includes an apparatus comprising: sector rotation logic to rotate an order of one or more sectors by a rotation value prior to storage of the one or more sectors in a non-volatile memory device; and sector de-rotation logic to rotate the one or more sectors back by the rotation value after reading the one or more sectors from the non-volatile memory device, wherein at least one indirection block, corresponding to the one or more sectors, is to be stored in at least two different logical memory pages of the non-volatile memory. Example 2 includes the apparatus of example 1, wherein a plurality of indirection blocks to be stored in the at least two different logical memory pages are to be aligned with a plurality of codewords in response to rotation of the one or more sectors by the rotation value. Example 3 includes the apparatus of example 1, wherein the at least one indirection block has a size of at least about 4 kB. Example 4 includes the apparatus of example 1, wherein the at least two different logical memory pages have a size of at least about 16 kB. Example 5 includes the apparatus of example 1, wherein a codeword, to be stored in the non-volatile memory, has a size of about 4 kB. Example 6 includes the apparatus of example 1, wherein each of the one or more sectors has a size of at least about 528 B. Example 7 includes the apparatus of example 1, wherein the rotation value is a multiple of two. Example 8 includes the apparatus of example 1, wherein the non-volatile memory device is to comprise one or more of: a solid state device (SSD), a phase change memory, a 3D (3-Dimensional) cross point memory, a resistive random access memory, and a spin torque transfer random access memory. Example 9 includes the apparatus of example 1, wherein a memory controller is to comprise the sector rotation logic and the sector de-rotation logic. Example 10 includes the apparatus of example 1, wherein one or more of the sector rotation logic, the sector de-rotation logic, the non-volatile memory device, and a processor core are on a same integrated circuit die.

Example 11 includes a method comprising: rotating an order of one or more sectors by a rotation value prior to storage of the one or more sectors in a non-volatile memory device; and rotating the one or more sectors back by the rotation value after reading the one or more sectors from the non-volatile memory device, wherein at least one indirection block, corresponding to the one or more sectors, is stored in at least two different logical memory pages of the non-volatile memory. Example 12 includes the method of example 11, further comprising aligning a plurality of indirection blocks stored in the at least two different logical memory pages with a plurality of codewords in response to rotation of the one or more sectors by the rotation value. Example 13 includes the method of example 11, wherein the at least one indirection block has a size of at least about 4 kB. Example 14 includes the method of example 11, wherein the at least two different logical memory pages have a size of at least about 16 kB. Example 15 includes the method of example 11, further comprising storing a codeword, having a size of about 4 kB, in the non-volatile memory. Example 16 includes the method of example 11, wherein each of the one or more sectors has a size of at least about 528 B. Example 17 includes the method of example 11, wherein the rotation value is a multiple of two. Example 18 includes the method of example 11, wherein the non-volatile memory device comprises one or more of: a solid state device (SSD), a phase change memory, a 3D (3-Dimensional) cross point memory, a resistive random access memory, and a spin torque transfer random access memory.

Example 19 includes a system comprising: a non-volatile memory device; at least one processor core to access the non-volatile memory device; sector rotation logic to rotate an order of one or more sectors by a rotation value prior to storage of the one or more sectors in a non-volatile memory device; and sector de-rotation logic to rotate the one or more sectors back by the rotation value after reading the one or more sectors from the non-volatile memory device, wherein at least one indirection block, corresponding to the one or more sectors, is to be stored in at least two different logical memory pages of the non-volatile memory. Example 20 includes the system of example 19, wherein a plurality of indirection blocks to be stored in the at least two different logical memory pages are to be aligned with a plurality of codewords in response to rotation of the one or more sectors by the rotation value. Example 21 includes the system of example 19, wherein a codeword, to be stored in the non-volatile memory, has a size of about 4 kB. Example 22 includes the system of example 19, wherein the rotation value is a multiple of two. Example 23 includes the system of example 19, wherein the non-volatile memory device is to comprise one or more of: a solid state device (SSD), a phase change memory, a 3D (3-Dimensional) cross point memory, a resistive random access memory, and a spin torque transfer random access memory. Example 24 includes the system of example 19, wherein a memory controller is to comprise the sector rotation logic and the sector de-rotation logic. Example 25 includes the system of example 19, wherein one or more of the sector rotation logic, the sector de-rotation logic, the non-volatile memory device, and the at least one processor core are on a same integrated circuit die.

Example 26 includes a computer-readable medium comprising one or more instructions that when executed on a processor configure the processor to perform one or more operations of any of examples 11 to 18.

Example 27 includes an apparatus comprising means to perform a method as set forth in any of examples 11 to 18.

Example 28 includes an apparatus comprising means to perform a method as set forth in any preceding example.

Example 29 includes machine-readable storage including machine-readable instructions, when executed, to implement a method or realize an apparatus as set forth in any preceding example.

Example 30 includes a computer-readable medium comprising one or more instructions that when executed on a processor configure the processor to perform one or more operations to: rotate an order of one or more sectors by a rotation value prior to storage of the one or more sectors in a non-volatile memory device; and rotate the one or more sectors back by the rotation value after reading the one or more sectors from the non-volatile memory device, wherein at least one indirection block, corresponding to the one or more sectors, is stored in at least two different logical memory pages of the non-volatile memory. Example 31 includes the computer-readable medium of example 30, further comprising one or more instructions that when executed on the processor configure the processor to perform one or more operations to cause alignment of a plurality of indirection blocks stored in the at least two different logical memory pages with a plurality of codewords in response to rotation of the one or more sectors by the rotation value. Example 32 includes the computer-readable medium of example 30, further comprising one or more instructions that when executed on the processor configure the processor to perform one or more operations to cause storage of a codeword, having a size of about 4 kB, in the non-volatile memory.

In various embodiments, the operations discussed herein, e.g., with reference to FIGS. 1-7, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   sector rotation logic to rotate an order of one or more sectors by a rotation value before the one or more sectors are to be stored in a non-volatile memory; and
   sector de-rotation logic to rotate the one or more sectors back by the rotation value after the one or more sectors are to be read from the non-volatile memory,
   wherein at least one indirection block, corresponding to the one or more sectors, is to be stored in at least two different logical memory pages of the non-volatile memory, wherein the at least one indirection block is unaligned with a corresponding codeword prior to rotation of the one or more sectors by the rotation value and the at least one indirection block is to be aligned with the corresponding codeword after rotation of the one or more sectors by the rotation value.

2. The apparatus of claim 1, wherein a plurality of indirection blocks to be stored in the at least two different logical memory pages are to be aligned with a plurality of codewords in response to rotation of the one or more sectors by the rotation value.

3. The apparatus of claim 1, wherein the at least one indirection block is to have a size of at least about 4kB.

4. The apparatus of claim 1, wherein the at least two different logical memory pages are to have a size of at least about 16kB.

5. The apparatus of claim 1, wherein a codeword, to be stored in the non-volatile memory, is to have a size of about 4kB.

6. The apparatus of claim 1, wherein each of the one or more sectors is to have a size of at least about 528B.

7. The apparatus of claim 1, wherein the rotation value is to be a multiple of two.

8. The apparatus of claim 1, wherein the non-volatile memory is to comprise one or more of: a phase change memory, a 3D (3-Dimensional) cross point memory, a resistive random access memory, and a spin torque transfer random access memory.

9. The apparatus of claim 1, wherein a memory controller is to comprise the sector rotation logic and the sector de-rotation logic.

10. The apparatus of claim 1, wherein one or more of the sector rotation logic, the sector de-rotation logic, the non-volatile memory, and a processor core are to be on a same integrated circuit die.

11. A method comprising:
rotating an order of one or more sectors by a rotation value prior to storage of the one or more sectors in a non-volatile memory; and
rotating the one or more sectors back by the rotation value after reading the one or more sectors from the non-volatile memory,
wherein at least one indirection block, corresponding to the one or more sectors, is stored in at least two different logical memory pages of the non-volatile memory, wherein the at least one indirection block is unaligned with a corresponding codeword prior to rotation of the one or more sectors by the rotation value and the at least one indirection block is aligned with the corresponding codeword after rotation of the one or more sectors by the rotation value.

12. The method of claim 11, further comprising aligning a plurality of indirection blocks stored in the at least two different logical memory pages with a plurality of codewords in response to rotation of the one or more sectors by the rotation value.

13. The method of claim 11, wherein the at least one indirection block has a size of at least about 4kB.

14. The method of claim 11, wherein the at least two different logical memory pages have a size of at least about 16kB.

15. The method of claim 11, further comprising storing a codeword, having a size of about 4kB, in the non-volatile memory.

16. The method of claim 11, wherein each of the one or more sectors has a size of at least about 528B.

17. The method of claim 11, wherein the rotation value is a multiple of two.

18. The method of claim 11, wherein the non-volatile memory comprises one or more of: a phase change memory, a 3D (3-Dimensional) cross point memory, a resistive random access memory, and a spin torque transfer random access memory.

19. A system comprising:
a non-volatile memory;
at least one processor core to access the non-volatile memory;
sector rotation logic to rotate an order of one or more sectors by a rotation value before the one or more sectors are to be stored in the non-volatile memory; and
sector de-rotation logic to rotate the one or more sectors back by the rotation value after the one or more sectors are to be read from the non-volatile memory,
wherein at least one indirection block, corresponding to the one or more sectors, is to be stored in at least two different logical memory pages of the non-volatile memory, wherein the at least one indirection block is unaligned with a corresponding codeword prior to rotation of the one or more sectors by the rotation value and the at least one indirection block is to be aligned with the corresponding codeword after rotation of the one or more sectors by the rotation value.

20. The system of claim 19, wherein a plurality of indirection blocks to be stored in the at least two different logical memory pages are to be aligned with a plurality of codewords in response to rotation of the one or more sectors by the rotation value.

21. The system of claim 19, wherein a codeword, to be stored in the non-volatile memory, has a size of about 4kB.

22. The system of claim 19, wherein the rotation value is to be a multiple of two.

23. A non-transitory computer-readable medium comprising one or more instructions that when executed on a processor configure the processor to perform one or more operations to:
rotate an order of one or more sectors by a rotation value prior to storage of the one or more sectors in a non-volatile memory; and
rotate the one or more sectors back by the rotation value after reading the one or more sectors from the non-volatile memory,
wherein at least one indirection block, corresponding to the one or more sectors, is stored in at least two different logical memory pages of the non-volatile memory, wherein the at least one indirection block is unaligned with a corresponding codeword prior to rotation of the one or more sectors by the rotation value and the at least one indirection block is aligned with the corresponding codeword after rotation of the one or more sectors by the rotation value.

24. The non-transitory computer-readable medium of claim 23, further comprising one or more instructions that when executed on the processor configure the processor to perform one or more operations to cause alignment of a plurality of indirection blocks stored in the at least two different logical memory pages with a plurality of codewords in response to rotation of the one or more sectors by the rotation value.

25. The non-transitory computer-readable medium of claim 23, further comprising one or more instructions that when executed on the processor configure the processor to perform one or more operations to cause storage of a codeword, having a size of about 4kB, in the non-volatile memory.

* * * * *